US007162103B2

(12) United States Patent
Meunier et al.

(10) Patent No.: US 7,162,103 B2
(45) Date of Patent: Jan. 9, 2007

(54) OUTPUT JOB REQUEST ELECTRONIC MESSAGE NOTIFICATION SYSTEM AND METHOD

(75) Inventors: Jean-Luc Meunier, Saint Nazaire les Eymes (FR); Jean-Yves Vion-Dury, Saint-Ismier (FR)

(73) Assignee: Xerox Corporation, Stamford, CT (US)

( * ) Notice: Subject to any disclaimer, the term of this patent is extended or adjusted under 35 U.S.C. 154(b) by 772 days.

(21) Appl. No.: 10/622,826

(22) Filed: Jul. 21, 2003

(65) Prior Publication Data

US 2005/0044183 A1 Feb. 24, 2005

(51) Int. Cl.
G06K 9/54 (2006.01)
G06F 3/12 (2006.01)
G06F 15/16 (2006.01)

(52) U.S. Cl. ................ 382/305; 358/1.15; 709/219
(58) Field of Classification Search ........... 382/305; 358/1.13, 1.15, 1.16; 709/219, 221; 710/8, 710/19
See application file for complete search history.

(56) References Cited

U.S. PATENT DOCUMENTS

| 5,611,046 | A | * | 3/1997 | Russell et al. ............. 358/1.16 |
| 5,862,321 | A | | 1/1999 | Lamming et al. ........ 395/200.3 |
| 5,862,404 | A | * | 1/1999 | Onaga ........................... 710/8 |
| 6,023,727 | A | * | 2/2000 | Barrett et al. ............... 709/221 |
| 6,219,151 | B1 | * | 4/2001 | Manglapus et al. ........ 358/1.15 |
| 6,519,048 | B1 | * | 2/2003 | Tanaka ........................ 358/1.13 |
| 6,842,898 | B1 | * | 1/2005 | Carlson et al. ............. 718/100 |
| 2002/0080387 | A1 | | 6/2002 | Grasso et al. .............. 358/1.15 |
| 2002/0116291 | A1 | | 8/2002 | Grasso et al. ................. 705/27 |
| 2003/0061201 | A1 | | 3/2003 | Grefenstette et al. .......... 707/3 |
| 2004/0145771 | A1 | * | 7/2004 | Stringham ................. 358/1.15 |

OTHER PUBLICATIONS

"Welcome to SmartPrinter" available on the Internet Apr. 2003 at http://www.xrce.xerox.com/competencies/contextual-computing/past-projects/projects/smartprinter/home.html.

(Continued)

Primary Examiner—Kanjibhai Patel

(57) ABSTRACT

An electronic status notification message for an output job request, which identifies a document for processing at an output device, is received from a submitter. A copy of the document is received, and the output job request is forwarded to the output device. Selected document services are applied to the copy of the document to define an archive of the document. The archive of the document is stored on a document repository. Similarity data is produced by evaluating the archive of the document with other documents in the document repository. Job status information is received concerning the output job request forwarded to the output device. The electronic status notification message is prepared using static and dynamic data concerning the job status information of the output job request and the similarity data of the document archived in the document repository. The electronic status notification message is transmitted to the submitter.

20 Claims, 4 Drawing Sheets

OTHER PUBLICATIONS

Grasso et al., "Who Can Claim Complete Abstinence from Peeking at Print Jobs?", in Proceedings of CSCW 2002, New Orleans, USA, Nov. 16, 2002.

Grasso, "Mining community knowledge from the print stream", in Workshop on Community Knowledge, ECSCW 2001,Bonn, Germany, Sep. 16-20, 2001.

Grasso et al., "Augmenting Recommender Systems by Embedding Interfaces into Office Practices", in Proceedings of HICSS-33, Jan. 4-7, 2000, Island of Maui, Hawaii.

Whittaker et al., "Email overload: exploring personal information management of email", in Proceedings of CHI'96 Conference on Computer Human Interaction, NY: ACM Press, 276-283, 1996.

"Submitting Print Requests", in Solaris Advanced User's Guide of Solaris 2.6 User Collection, Chapter 8, Section 1, 1994.

Meyer, "eCabinet and File Processing: File Evolution from Capture to Retrieval", Ricoh Silicon Valley, available on the Internet at http://www.ecabinet.net/pdf/file_evol_wp.pdf, Apr. 2001.

Hull et al., "Towards zero-effort personal document management: a new paradigm for users", in IEEE's Computer Magazine, vol. 34, No. 3, pp. 30-35, Mar. 2001.

Flowport User Guide, Version 2.1, Nov. 2000.

U.S. Appl. No. 10/217,025, entitled "Shared Document Repository With Coupled Recommender System".

* cited by examiner

OUTPUT JOB REQUEST ELECTRONIC MESSAGE NOTIFICATION SYSTEM AND METHOD

BACKGROUND OF INVENTION

1. Field of the Invention

The present invention relates generally to a method and apparatus for providing status information for print job requests while simultaneously providing document archival, document services, and community services related to the print request.

2. Description of Related Art

Generally, systems that support communities of practice in work organizations tend to be decoupled from daily work practices. By coupling such systems directly with daily work practices users are able to benefit from such systems without additional efforts. Benefiting from systems that support communities of practice means that knowledge that is relevant within a community of users is efficiently captured and shared between the users of the community.

One such system known as the "SmartPrinter" developed by Xerox Corporation captures data within a print stream. The SmartPrinter system captures and archives the contents of about-to-be printed documents, as well as, information about the document (e.g., title), and sends it to a print memory to preserve it for future use (e.g., archive) and sharing (e.g., community knowledge).

After a document is recorded in print memory, the SmartPrinter system may be used to apply one or more document services to the stored document. Such document services include document conversion, translation, linguistic-based content analysis, document identification and comparison, keyword indexing, categorization and clustering, and data mining.

With the ability to automatically perform document services on a print stream, the SmartPrinter system can be integrated with other software to further automate knowledge flow by, for example, providing automatic distribution, enterprise storage, search and retrieval, translation, and summarization. As a community tool, the SmartPrinter system enhances awareness of community interest and activities by allowing community users to identify documents of related interest.

In operation, the SmartPrinter system generates a coversheet for every printed document. The coversheet acts as a container of information about the document and identified related documents. Embedded in the coversheet is an encoded identifier of the document (that is also recorded in memory of the SmartPrinter system) and checkboxes or entry boxes to allow a user to specify instructions, enter handwritten notes, assign categories and keywords, draw connections among documents, send identified files to an archive or distribute them to community members. Once the coversheet is completed, it is scanned and decoded to carry out the specified instructions.

The SmartPrinter system is more fully described in the following publications, which are all incorporated herein by reference: U.S. patent application Publications US 2002/0080387 A1 and US 2002/0116291 A1; "Welcome to SmartPrinter" available on the Internet April 2003 at http://www.xrce.xerox.com; Grasso et al., "Who Can Claim Complete Abstinence from Peeking at Print Jobs?", in Proceedings of CSCW 2002, New Orleans, USA, Nov. 16, 2002; Grasso, "Mining community knowledge from the print stream", in Workshop on Community Knowledge, ECSCW 2001, Bonn, Germany, 16–20 Sep., 2001; Grasso et al., "Augmenting Recommender Systems by Embedding Interfaces into Office Practices", in Proceedings of HICSS-33, 4–7 Jan., 2000.

Similar to the SmartPrinter system developed by Xerox Corporation, Ricoh Corporation has developed a system called the eCabinet™ for automatically archiving and managing files from networked peripherals such as printers, scanners, and fax machines. The eCabinet™ is more fully described in the following publications: Meyer, "eCabinet and File Processing: File Evolution from Capture to Retrieval", Ricoh Silicon Valley, available on the Internet at http://www.ecabinet.net/pdf/file_evol_wp.pdf, April, 2001; and Hull et al., "Towards zero-effort personal document management: a new paradigm for users", in IEEE's Computer Magazine, Vol. 34, No. 3, pp. 30–35, March 2001.

Notwithstanding these existing systems, email users continue to make use of email as an archival tool. However, using email as an archival tool does not facilitate the sharing of such archived email or their attached documents with a community of users. It would therefore be desirable to provide a system that allows the practice of using email as a tool to archive email or documents attached to the email while simultaneously providing document services and community services, as well as, dynamic (i.e., up-to-date) information related thereto. Advantageously, such a system would allow electronic mail (i.e., email message and document attachments) to be more easily shared between community members, at the same time it is archived. In this way, electronic mail and service requests can be integrally linked as an integrated archival and knowledge sharing tool that allows users to archive and save information without having to consciously do so (i.e., while using customary work practices).

SUMMARY OF INVENTION

In accordance with the invention there is provided a system, article of manufacture and method therefor, for providing an electronic status notification message for an output job request. The output job request, which identifies a document for processing at an output device, is received from a submitter. In addition, a copy of the document is received, and the output job request is forwarded to the output device. Selected document services are applied to the copy of the document to define an archive of the document. The archive of the document is stored on a document repository. Similarity data is produced by evaluating the archive of the document with other documents in the document repository. Job status information is received concerning the output job request forwarded to the output device. The electronic status notification message is prepared using static and dynamic data concerning the job status information of the output job request and the similarity data of the document archived in the document repository. The electronic status notification message is transmitted to the submitter thereby integrally linking archival and knowledge sharing information, document services, and customary email usage.

BRIEF DESCRIPTION OF DRAWINGS

These and other aspects of the invention will become apparent from the following description read in conjunction with the accompanying drawings wherein the same reference numerals have been applied to like parts and in which.

DETAILED DESCRIPTION

Figure 1:
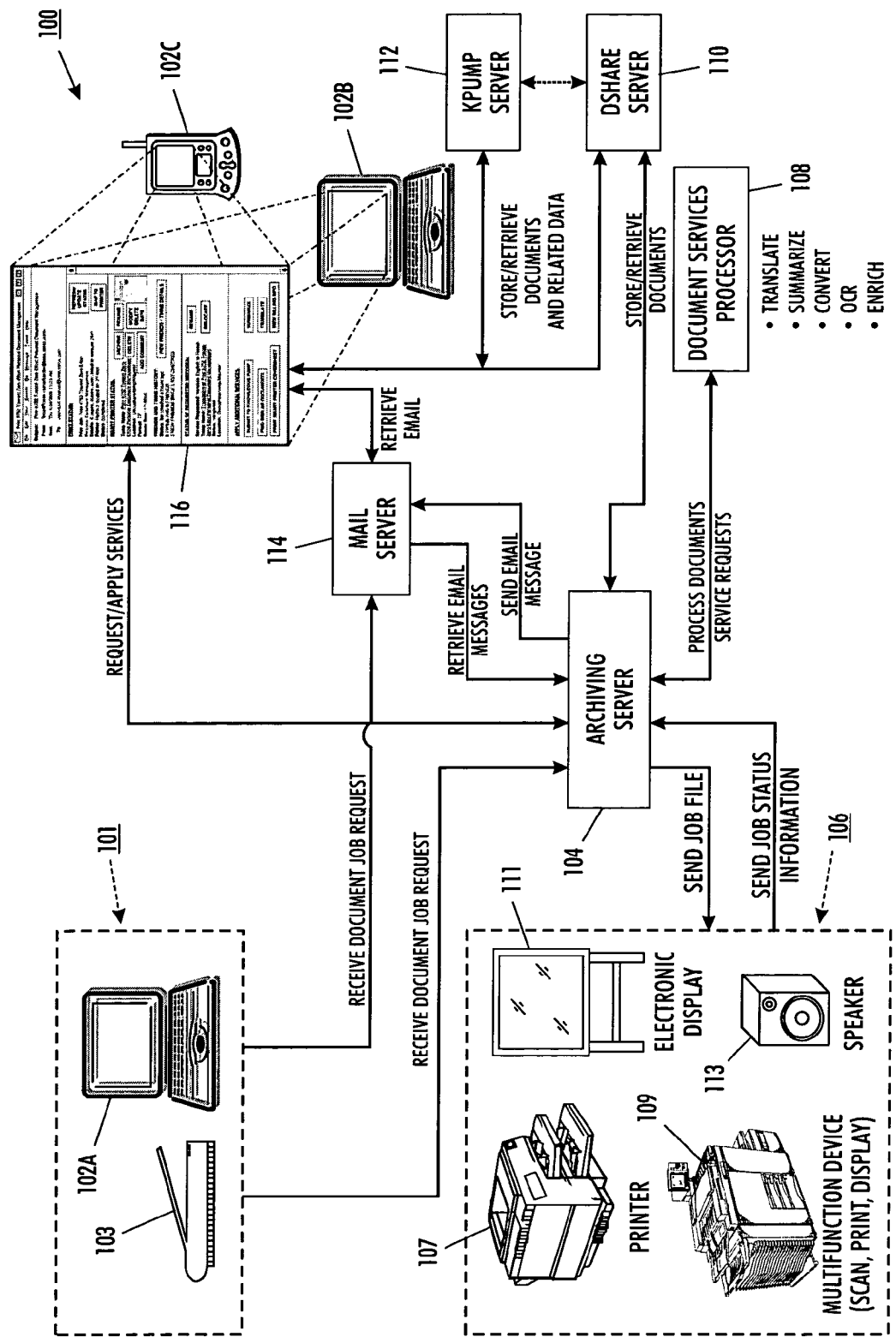
FIG. 1 illustrates a system for providing print status requests in accordance with the present invention.

FIG. 1 illustrates a system 100 for providing electronic status notification messages for output job requests in accordance with the present invention. In the embodiment shown in FIG. 1, the system 100 includes input devices 101 (e.g., client computers 102 (e.g., workstation, laptop, desktop, PDA) or scanner 103, camera (not shown), microphone (not shown), or any combination thereof), an archiving server 104, output devices 106 (e.g., printer 107, display 111, multifunction, device 109, speaker 113, or any combination thereof), document services processor 108, DShare server 110, KPump server 112, and electronic message server 114.

The client computers 102 include any number/quantity of processors, memory, wired or wireless network connections, and user inputs (e.g., keyboard, pointing devices). The electronic message server 114 is any known electronic message server adapted to receive and transmit electronic status notification messages (or electronic messages) 116 such as email, SMS (Short Message Service) messages, instant messaging, etc.

The document services processor 108 is a sub-system that receives as input a document and provides as output the document with the requested document service applied thereto. The requested document service may include any one or more combinations of format conversion, language translation, character recognition (i.e., OCR), summarization, categorization, and enrichment, each may or may not include natural language processing including but not limited to tokenization and morphological analysis. In one embodiment, enrichment is performed as described in patent application Publication US 2003/0061201 A1, entitled "System For Propagating Enrichment Between Documents", which is incorporated herein by reference, including all references cited or incorporated therein.

The DShare server 110 is a shared and/or private document repository. The KPump server 112 is a recommender system for sharing knowledge between a community of users. In one embodiment, the DShare server 110 and KPump server 112 are servers that are operatively coupled together to allow users of a shared document repository to input and read reviews of documents contained in the repository, as described in U.S. patent application Ser. No. 10/217,025, entitled "Shared Document Repository With Coupled Recommender System", which is incorporated herein by reference including all references cited or incorporated therein.

In alternate embodiments of the system 100, the archiving server 104, the electronic message server 114, the document services processor 108, DShare server 110, and KPump server 112 may be operatively coupled together as a single program or as separate programs using one or more computers communicating together over networks such as the Internet. In addition, the client computers 102 and output devices 106 may be coupled to other elements of the system over wired or wireless networks.

In one alternate embodiment, the client computers may be mobile devices such as cellular phones adapted to operate in a token-enabled environment. An example of a token-enabled environment is described in the following patents, and patent applications which are hereby incorporated herein by reference: U.S. Pat. Nos. 5,862,321; 6,144,997; 6,397,261; 6,421,716; 6,430,601; 6,487,189; 6,493,760; 6,515,988; and U.S. Patent Publication Nos. US 2003/0050963 A1 and US 2003/0069921 A1.

Figure 2:
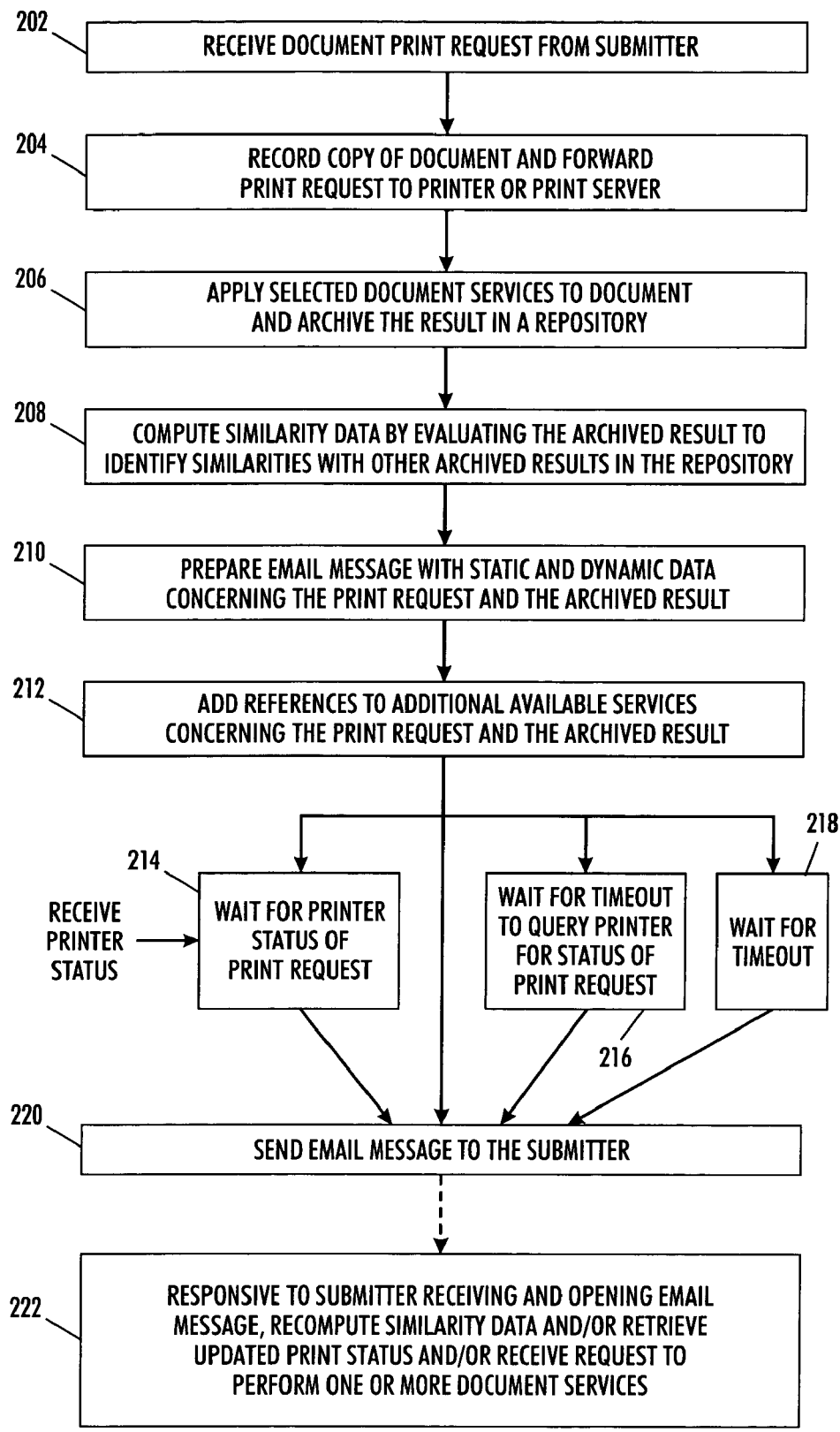
FIG. 2 illustrates a flow diagram that details one sequence of operations that are performed in one embodiment by the system shown in FIG. 1.

FIG. 2 illustrates a flow diagram that details one sequence of operations that are performed in one embodiment by the system shown in FIG. 1. In the embodiment detailed in FIG. 2, the output device 106 is a printer 107, although one skilled in the art will readily appreciate that the output device could alternatively be, for example, the electronic display 111 or speaker 113 or a combination thereof.

At 202, the archiving server 104 receives from the client computer 102A an output job request, or in the case of printer 107 a print request. As defined herein an output job request is a request to output or process a document at a specified output device (e.g., printer, display, speaker, or a combination thereof). In an alternate embodiment, the archiving server 104 may receive an output job request from a specific input device 101 other than a client computer 102A such as from scanner 103 or a microphone or camera (not shown).

In one embodiment, the output job request received by the archiving server 104 is directed to a selected output device such as print device 107, using a standard (unmodified) driver of the selected output device. Advantageously, this embodiment does not require changes to drivers of output devices 106 to enable operation of the archiving server 104. In this embodiment, an input queue is defined for which the archiving server 104 is the input queue manager. The archiving server 104 is adapted to manage any number of input queues representing any number of output devices 106.

Figure 3:
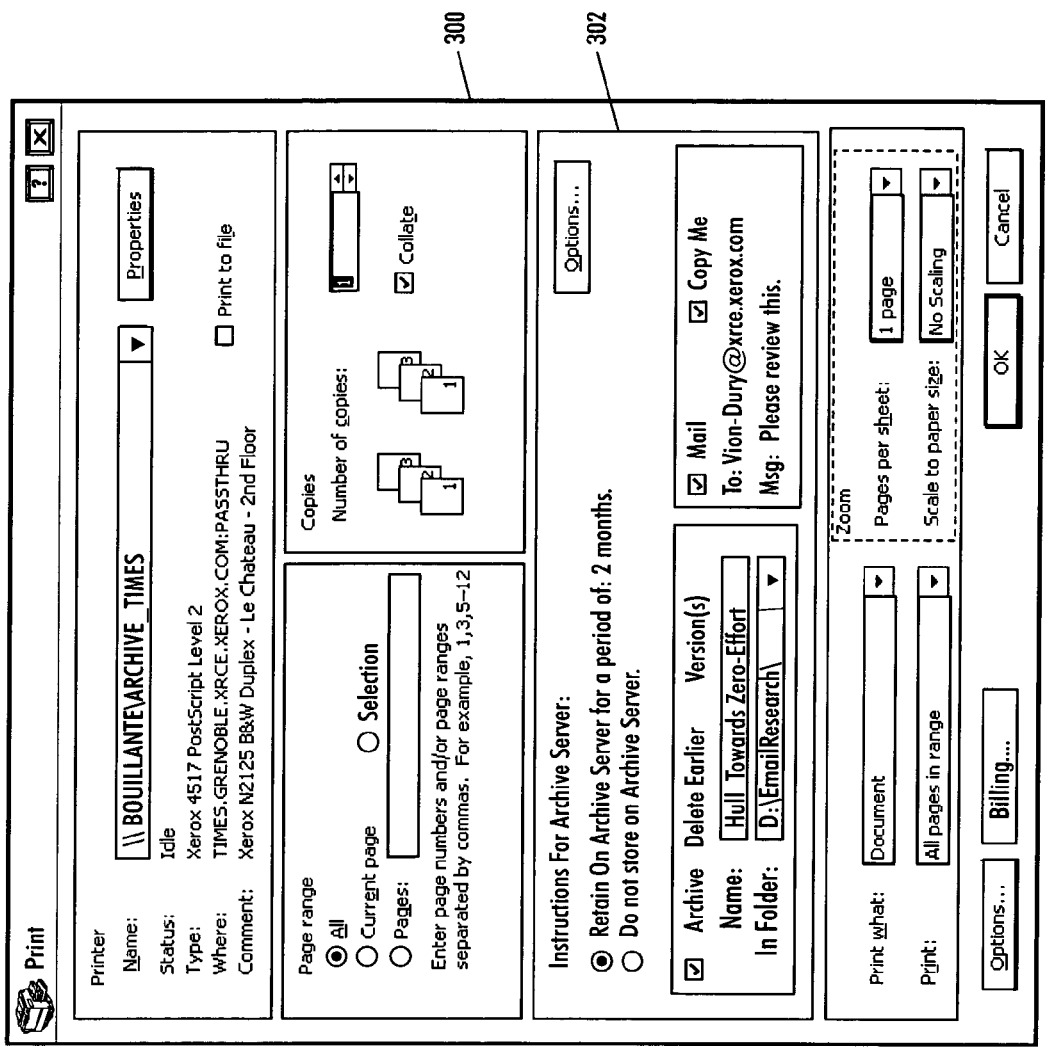
FIG. 3 illustrates one embodiment for submitting a print request to the archiving output server when a specific driver is defined for an output device.

In an alternate embodiment, functionality of the archiving server 104 forms part of the driver for the printer 107 or alternate output device. In this alternate embodiment, any number of functionalities of the archiving server may be specified when the submitter defines the document print request. FIG. 3 illustrates one embodiment for submitting a document print request to the archiving server 104 when a specific driver is defined for the print device adapted to specify functionality of the archiving server 104.

More specifically in FIG. 3, an example client interface 300 for the printer 107 is illustrated. The client interface 300 enables a user to specify at print time, or more generally at the time the output request is defined, some or all of the services to be performed by the archiving server 104, and their associated properties. In the example shown in FIG. 3, instructions for the archiving server are specified in window 302 of the client interface 300.

Referring again to FIG. 2, once a document print (or output job) request for a document is received in any manner described above from a submitter, at 202, the archiving server 104 records a copy of the document associated with the print request, at 204, and forwards the print request to the printer or print server associated with the print request. As defined herein, a document may consist of either image, audio, and video data, or any combination thereof. The data may consist of high level structure information such as an XML document. Alternatively, data may consist of data without any predefined structure such as scanned images from scanner 103.

At 206, selected document services are applied to the document recorded and the results are archived in a repository such as the DShare server 110. The selected document services may either be selected by default or at the time the document output request is made. Selected document services include any one or more combinations of format conversion, language translation, character recognition (i.e., OCR), summarization, categorization, and enrichment, each may or may not include natural language processing including but not limited to tokenization and morphological.

At 208, similarity data of the document recorded at 204 is computed by evaluating the similarity of the archived result and other documents in the repository of DShare server 110. In one embodiment, the similarity between documents is calculated as the sum of the weights of all keywords (or phrases) two documents have in common divided by the sum of the weights of all keywords associated with the two documents, as disclosed in Patent Application Publication U.S. 2002/0116291 A1, entitled "Recommender System And Method", which is incorporated herein by reference.

At 210, an electronic message (e.g., email, SMS, chat, etc.) is prepared with static and dynamic data concerning the print request received at 202. Static data includes information such as the number of pages of the print request, the name of the print request, etc. Dynamic data includes similarity data, location of the archive document, duration the document will remain in archive, etc.

At 212, references to additional services available concerning the print request are added to the electronic message. Additional services may include access to the recommender system provided by the KPump server 112 or any other additional document service offered by the document services processor 108.

At 220, the electronic message is sent to the submitter of the print request, either immediately or after some elapsed period of time at 218, or after carrying out operations at 214 or 216, depending on user preferences and/or default settings of the archiving server 104. At 214, the archiving server 104 waits to receive printer status information from the printer 107 before sending the electronic message to the submitter at 220. In an alternate embodiment, the archiving server 104 queries the printer for status information after a predefined period of time has elapsed. In either embodiment, the electronic message is sent after transitioning to a particular print status (e.g., completed, cancelled, etc.).

At 222, responsive to the submitter receiving and opening the electronic message at, for example, client computers 102B or 102C, dynamically produced data is recomputed (e.g., similarity data, print status information, etc.) and loaded into the electronic message. In addition at 222, the archiving server and/or DShare server 110 and KPump server 112 may receive requests to perform one or more document related services.

Figure 4:
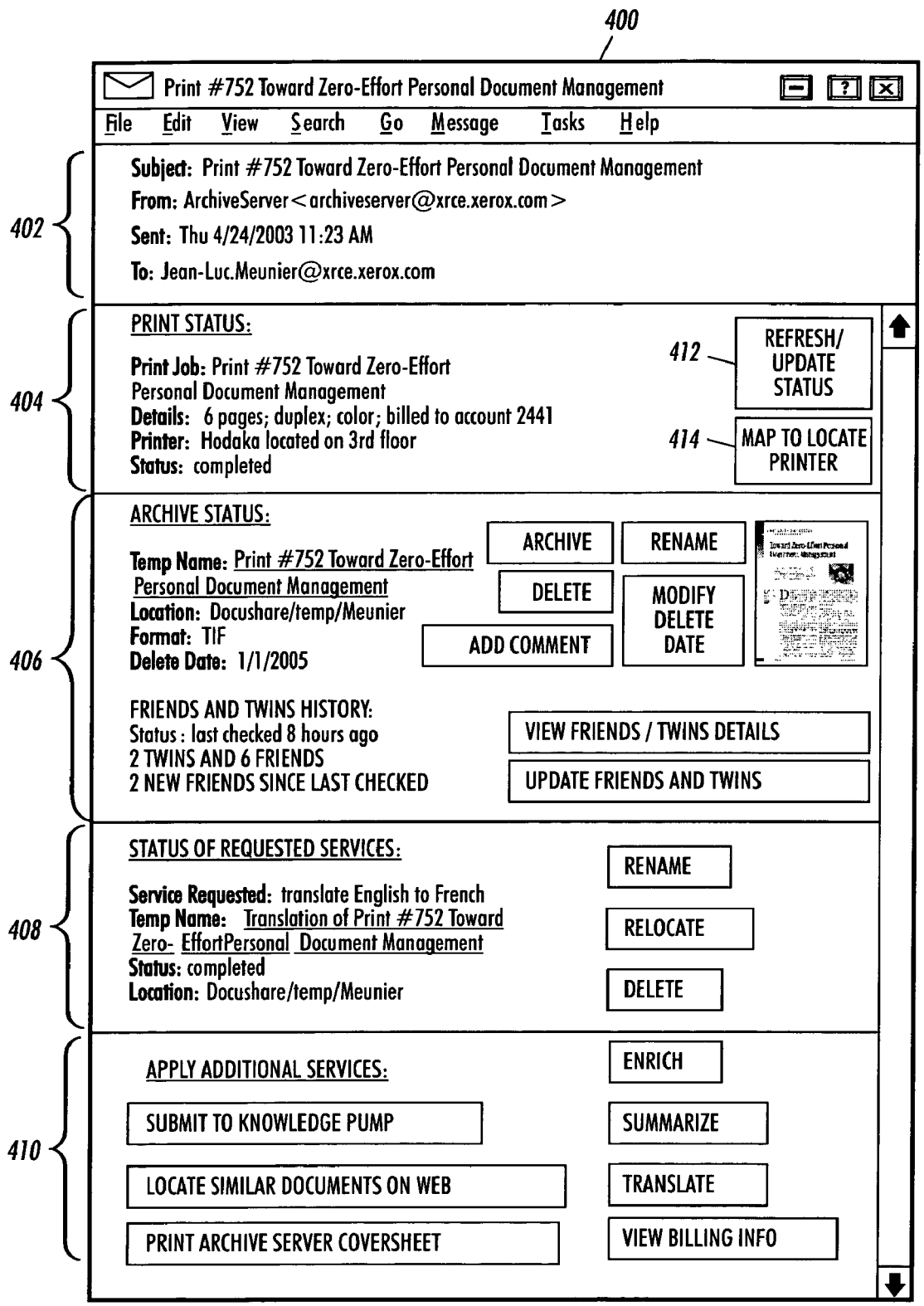
FIG. 4 illustrates an electronic mail message sent by the archiving server to the submitter of a job request.

FIG. 4 illustrates email message 400, an example electronic message 116, sent to the submitter at 220 in FIG. 2. The email message 400 includes email header section 402, print status section 404, archive status section 406, requested services section 408, and additional services section 410. In one embodiment, the email message 400 is in an HTML (or equivalent) format that permits content in the email message 400 to be dynamically updated when viewed. Also in this or another embodiment, the email client in which the email message 400 is read (that may for example be operating at client computers 102B and 102C) supports scripting, where it becomes possible to relate email actions to actions that should be performed at the archive server 104. For example in an embodiment with scripting, deleting the email message 400 may cause the deletion of the corresponding document associated with it archived in DShare server 110.

In the print status section 404, information is provided to the submitter regarding the printed document and the print context, such as: title, number of pages, printer name, and type (e.g., color, monochrome, highlight color, duplex/simplex), document URL if available, and other metadata regarding the printed document. In addition, the submitter reading the email message 400 has the ability to request an update to the print status at 412 and/or request a map to locate the printer at 414 (or other output device). The information in section 404 helps the user recall specifics about a print request as well as locate it.

In the archive status section 406, the user is given the ability to archive the document to another location, delete the document from the archive, rename the document, add comments to the document, modify the date the document is to be deleted from the archive, and view friends and/or twins of the document. Twins of a document sent to the archiving server 104 are documents archived in the DShare server 110 that are very close to the document itself (e.g., earlier versions). Friends of a document sent to the archiving server 104 are documents archived in the DShare server 110 that are related to the document itself (e.g., refer to the document or are referred by the document). Twins and friends of a document are updated dynamically when the email message 400 is opened or when an update is requested by the submitter to be performed.

In one embodiment, the archiving server 104 receives documents in a print-ready format (e.g., PostScript) from a print driver of the printer 107 operating on the client computer 102A. The archiving server 104 may convert the print-ready format to a standard exchange format (e.g., HTML, PDF). Alternatively the archive server 104 may be built on or integrated with print servers that accept and print documents in their native formats (e.g., word, excel, etc.) and may directly archive these documents. In addition or alternatively, the archiving server 104 may as part of archiving a document convert the native document into a standard exchange format (e.g., PDF, HTML) or a print-ready (e.g., PostScript) format. In any embodiment a link to the document can be provided to its archived form or included as an attachment to the email message 400. Such user preferences can be predefined in a user profile, or defined when the print request is made by the user, or, alternatively, set by default by the archiving server 104.

In the requested services section 408, the user is given the ability to relocate, rename, or delete the result which may viewed by selecting the link to it embedded in the temporary name assigned to it. In the example shown in email message 400, the user and/or archiving server has applied a language translation service using the document services processor 108.

In the additional services section 410, the user is provided links for invoking additional document services that include: submitting the document to the KPump server 112; enriching the document with links to documents archived in the DShare server 110; summarizing the contents of the document; translating the contents of the document to another language; locating similar document on the Internet; viewing billing information associated with the services performed for the document; and printing the email message 400 as a smart printer coversheet.

Advantageously, the electronic message 116 sent to a submitter provides a container for storing information concerning the document sent to the archive server 104 for output to a device such as printer 107. The container can be advantageously used to access related information and print hardcopy (e.g., paper) cover sheets with a machine readable identifier encoded thereon such as glyphs identifying the location of the document as well as identified regions for human readable marks that identify classification information for a knowledge management service. Hardcopy coversheets are more fully disclosed in Patent Application Publication US 2002/0080387 A1, which is incorporated herein by reference.

In an alternate embodiment, a user operating an input device 101 such as client computer 102A may specify a job request without specifying that it be processed by an output device. In one alternate embodiment, the scanner 103 is coupled to a scan forwarding service operated using a coversheet such as that offered by FlowPort® developed by Xerox Corporation to allow the submitter to submit job requests to the archiving server 104 without specifying that the document should be sent to an output device. For more background on FlowPort®, reference is made to the Flowport® User Guide, Version 2.1, November 2000, which is incorporated herein by reference. In another alternate embodiment, when "print to file" is selected at client interface 300 shown in FIG. 3, the print file is stored to the archiving server 104 and the print file is not sent to the corresponding printer.

Further in this embodiment, a user is able to archive the document on the DShare server 110 without having to output the document to an output device 106 (i.e., perform a "null output job request"), while benefiting from services referred to in the electronic message 116. In receiving the electronic message 116, a user can also advantageously use the electronic message 116 as a reminder of tasks to do related or associated with the document (e.g., in an inbox that is used as a to-do list). In addition, advantageously such electronic message 116 can be archived in the user's electronic message server 114, whether or not it is associated with any pending tasks.

In yet another embodiment, an electronic document can be submitted through a special driver for the archiving server 104. Alternatively, an electronic document can be submitted through an electronic message to the archiving server 104. In this alternate embodiment, the archiving server 104 uses for example an electronic message client to retrieve electronic messages with documents from senders. The electronic message acts as a submission driver for submitting a job request. Special commands can be specified in electronic messages that are interpreted as commands at the archiving server. In this embodiment, a user can forward the electronic message to the archiving server 104 with one or more attached documents. These documents can be output to a selected output device and then enriched as part of the electronic message 116 returned to the user.

Using the foregoing specification, the invention may be implemented as a machine (or system), process (or method), or article of manufacture by using standard programming and/or engineering techniques to produce programming software, firmware, hardware, or any combination thereof.

Any resulting program(s), having computer-readable program code, may be embodied within one or more computer-usable media such as memory devices or transmitting devices, thereby making a computer program product or article of manufacture according to the invention. As such, the terms "article of manufacture" and "computer program product" as used herein are intended to encompass a computer program existent (permanently, temporarily, or transitorily) on any computer-usable medium such as on any memory device or in any transmitting device.

Executing program code directly from one medium, storing program code onto a medium, copying the code from one medium to another medium, transmitting the code using a transmitting device, or other equivalent acts may involve the use of a memory or transmitting device which only embodies program code transitorily as a preliminary or final step in making, using, or selling the invention.

Memory devices include, but are not limited to, fixed (hard) disk drives, floppy disks (or diskettes), optical disks, magnetic tape, semiconductor memories such as RAM, ROM, Proms, etc. Transmitting devices include, but are not limited to, the Internet, intranets, electronic bulletin board and message/note exchanges, telephone/modem based network communication, hard-wired/cabled communication network, cellular communication, radio wave communication, satellite communication, and other stationary or mobile network systems/communication links.

A machine embodying the invention may involve one or more processing systems including, but not limited to, CPU, memory/storage devices, communication links, communication/transmitting devices, servers, I/O devices, or any subcomponents or individual parts of one or more processing systems, including software, firmware, hardware, or any combination or subcombination thereof, which embody the invention as set forth in the claims.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

What is claimed is:

1. A method for providing an electronic status notification message for an output job request, comprising:

receiving the output job request from a submitter; the output job request identifying a document for processing at an output device;

recording a copy of the document and forwarding the output job request to the output device;

applying selected document services to the copy of the document to define an archive of the document;

storing the archive of the document on a document repository;

producing similarity data by evaluating the archive of the document with other documents in the document repository;

receiving job status information concerning the output job request forwarded to the output device;

preparing the electronic status notification message using static and dynamic data concerning the job status information of the output job request and the similarity data of the document archived in the document repository;

transmitting the electronic status notification message to the submitter.

2. The method according to claim 1, further comprising preparing the document in a format suitable for the output device.

3. The method according to claim 1, further comprising receiving a request through the electronic status notification message to create a coversheet on a hardcopy medium.

4. The method according to claim 3, wherein the coversheet includes identified regions for human readable marks that identify classification information for a knowledge management service, and wherein the coversheet further includes machine readable markings identifying the document and its location in the document repository.

5. The method according to claim 1, wherein the output job request is a null output job request for which no output job is processed at the output device.

6. The method according to claim 1, further comprising receiving a request through the electronic status notification message to perform an additional document service on the document.

7. The method according to claim 6, wherein the additional document service is one of enrichment, translation, summarization, format conversion, and character recognition.

8. The method according to claim 7, wherein the additional document service is specified in the output job request.

9. The method according to claim 1, further comprising receiving a request through the electronic status notification message to submit the document to a server for sharing knowledge with a community of users.

10. The method according to claim 1, wherein the electronic status notification message is one of a mail message, an instant message, and an SMS message.

11. A system for providing an electronic status notification message for an output job request, comprising:
  a memory for storing processing instructions; and
  a processor coupled to the memory for executing the processing instructions of the system; the processor in executing the document processing instructions:
  receiving the output job request from a submitter; the output job request identifying a document for processing at an output device;
  recording a copy of the document and forwarding the output job request to the output device;
  applying selected document services to the copy of the document to define an archive of the document;
  storing the archive of the document on a document repository;
  producing similarity data by evaluating the archive of the document with other documents in the document repository;
  receiving job status information concerning the output job request forwarded to the output device;
  preparing the electronic status notification message using static and dynamic data concerning the job status information of the output job request and the similarity data of the document archived in the document repository;
  transmitting the electronic status notification message to the submitter.

12. The system according to claim 11, further comprising preparing the document in a format suitable for the output device.

13. The system according to claim 11, further comprising receiving a request through the electronic status notification message to create a coversheet on a hardcopy medium; wherein the coversheet includes identified regions for human readable marks that identify classification information for a knowledge management service, and wherein the coversheet further includes machine readable markings identifying the document and its location in the document repository.

14. The system according to claim 11, wherein the output job request is a null output job request for which no output job is processed at the output device.

15. The system according to claim 11, further comprising receiving a request through the electronic status notification message to perform an additional document service on the document or to submit the document to a server for sharing knowledge with a community of users; wherein the additional document service is one of enrichment, translation, summarization, format conversion, and character recognition; and wherein the additional document service is specified in the output job request.

16. An article of manufacture for use in a machine comprising:
  a) a memory;
  b) instructions stored in the memory for providing an electronic status notification message for an output job request, the method comprising:
  receiving the output job request from a submitter; the output job request identifying a document for processing at an output device;
  recording a copy of the document and forwarding the output job request to the output device;
  applying selected document services to the copy of the document to define an archive of the document;
  storing the archive of the document on a document repository;
  producing similarity data by evaluating the archive of the document with other documents in the document repository;
  receiving job status information concerning the output job request forwarded to the output device;
  preparing the electronic status notification message using static and dynamic data concerning the job status information of the output job request and the similarity data of the document archived in the document repository;
  transmitting the electronic status notification message to the submitter.

17. The article of manufacture according to claim 16, further comprising preparing the document in a format suitable for the output device.

18. The article of manufacture according to claim 16, further comprising receiving a request through the electronic status notification message to create a coversheet on a hardcopy medium; wherein the coversheet includes identified regions for human readable marks that identify classification information for a knowledge management service, and wherein the coversheet further includes machine readable markings identifying the document and its location in the document repository.

19. The article of manufacture according to claim 16, wherein the output job request is a null output job request for which no output job is processed at the output device.

20. The article of manufacture according to claim 16, further comprising receiving a request through the electronic status notification message to perform an additional document service on the document or to submit the document to a server for sharing knowledge with a community of users; wherein the additional document service is one of enrichment, translation, summarization, format conversion, and character recognition; and wherein the additional document service is specified in the output job request.

* * * * *